United States Patent
Wonderlich et al.

(10) Patent No.: US 10,701,857 B2
(45) Date of Patent: Jul. 7, 2020

(54) USING A SMALL DIAMETER EXIT HOSE TO IMPROVE DELIVERY OF LIQUID THROUGH A VALVE ON A NUTRIENT OR CHEMICAL APPLICATION SYSTEM OF AN AGRICULTURAL MACHINE

(71) Applicant: Deere & Company, Moline, IL (US)

(72) Inventors: Grant J. Wonderlich, Milan, IL (US); Kenneth Herrmann, Port Byron, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 16/016,066

(22) Filed: Jun. 22, 2018

(65) Prior Publication Data

US 2019/0289780 A1 Sep. 26, 2019

Related U.S. Application Data

(60) Provisional application No. 62/648,190, filed on Mar. 26, 2018.

(51) Int. Cl.
| | | |
|---|---|---|
| *A01C 23/04* | (2006.01) | |
| *A01C 7/06* | (2006.01) | |
| *A01C 23/02* | (2006.01) | |
| *A01C 23/00* | (2006.01) | |

(52) U.S. Cl.
CPC ............ *A01C 23/04* (2013.01); *A01C 7/06* (2013.01); *A01C 23/007* (2013.01); *A01C 23/025* (2013.01)

(58) Field of Classification Search
CPC .......... A01C 23/04; A01C 7/06; A01C 23/025
See application file for complete search history.

(56) References Cited

U.S. PATENT DOCUMENTS

| | | |
|---|---|---|
| 5,507,436 A | 4/1996 | Ruttenberg |
| 6,264,069 B1 | 7/2001 | Hughes et al. |
| 6,990,911 B2 | 1/2006 | Schneider |
| 8,505,291 B2 | 8/2013 | Wu et al. |
| 9,426,940 B2 * | 8/2016 | Connors ............... A01C 7/102 |
| 9,756,779 B2 * | 9/2017 | Wilhelmi ................ A01C 7/20 |
| 9,763,361 B2 | 9/2017 | Grimm et al. |
| 10,251,337 B2 * | 4/2019 | Conrad ............... A01C 23/047 |
| 2002/0043197 A1 | 4/2002 | Schaffert |
| 2010/0282147 A1 * | 11/2010 | Wollenhaupt ........... A01C 7/06 111/200 |

(Continued)

FOREIGN PATENT DOCUMENTS

| | | |
|---|---|---|
| WO | 2015171915 A1 | 11/2015 |
| WO | 2017058616 A1 | 4/2017 |

OTHER PUBLICATIONS

Omara, Ahmed A., "A pulse-width-modulated flow-control valve" (1992).Theses and Dissertations. Paper 77, 71 pages.

(Continued)

*Primary Examiner* — Donnell A Long
(74) *Attorney, Agent, or Firm* — Joseph R. Kelly; Kelly, Holt & Christenson PLLC

(57) ABSTRACT

A mobile agricultural machine has a valve controlled to apply liquid material to a field. An application assembly defines a conduit from the valve to a distal application tip. The application assembly includes a distal conduit section that has an inner diameter that is smaller than an inner diameter of a more proximal conduit section, that is closer to the valve, than the distal tip of the application assembly.

20 Claims, 4 Drawing Sheets

(56) References Cited

U.S. PATENT DOCUMENTS

| | | |
|---|---|---|
| 2011/0203500 A1 | 8/2011 | des Garennes et al. |
| 2014/0299673 A1 | 10/2014 | Grimm |
| 2016/0128263 A1 | 5/2016 | Bassett |
| 2017/0251590 A1 | 9/2017 | Kolb et al. |
| 2019/0291125 A1 | 9/2019 | Wonderlich et al. |

OTHER PUBLICATIONS

Prosecution History for U.S. Appl. No. 16/016,083 including: Response to Restriction Requirement dated Sep. 5, 2019 and Restriction Requirement dated Aug. 9, 2019, 7 pages.

U.S. Appl. No. 16/016,083, filed Jun. 22, 2018, Application and Drawings, 21 pages.

European Search Report issued in counterpart application No. 19155830.3 dated Aug. 9, 2019. (11 pages).

European Search Report issued in counterpart application No. 19157187.6 dated Aug. 9, 2019. (10 pages).

U.S. Appl. No. 16/016,083 Office Action dated Dec. 12, 2019, 18 pages.

\* cited by examiner

US 10,701,857 B2

USING A SMALL DIAMETER EXIT HOSE TO IMPROVE DELIVERY OF LIQUID THROUGH A VALVE ON A NUTRIENT OR CHEMICAL APPLICATION SYSTEM OF AN AGRICULTURAL MACHINE

CROSS-REFERENCE TO RELATED APPLICATION

The present application is based on and claims the benefit of U.S. provisional patent application Ser. No. 62/648,190, filed Mar. 26, 2018, the content of which is hereby incorporated by reference in its entirety.

FIELD OF THE DESCRIPTION

The present description relates to agricultural machines. More specifically, the present description relates to controlling liquid application using an agricultural machine.

BACKGROUND

There is a wide variety of different types of agricultural machines that apply a liquid material. Some such agricultural machines include sprayers, tillage machines with side dressing bars, air seeders and planters that have row units.

As one example, a row unit is often mounted on a planter with a plurality of other row units. The planter is often towed by a tractor over soil where seed is planted in the soil, using the row units. The row units on the planter follow the ground profile by using a combination of a downforce assembly that imparts a downforce on the row unit to push disc openers into the ground and gauge wheels to set depth of penetration of the disc openers.

Row units can also be used to apply liquid material to the field (e.g., to the soil, to a plant, to a seed, etc.) over which they are traveling. In some scenarios, each row unit has a pulse-controlled valve (such as a valve controlled using a pulse width modulated signal) that is coupled between a source of liquid material, and an application assembly. As the valve is pulsed, liquid passes through the valve, from the source to the application assembly, and is applied to the field. This type of metering, using a pulsed control signal, induces a pulsing dynamic into the flow of the liquid material. Even where the valve is not controlled using a pulsed control signal, pulsation can be introduced through other sources, such as a pump.

The discussion above is merely provided for general background information and is not intended to be used as an aid in determining the scope of the claimed subject matter.

SUMMARY

A mobile agricultural machine has a valve controlled to apply liquid material to a field. An application assembly defines a conduit from the valve to a distal application tip. The application assembly includes a distal conduit section that has an inner diameter that is smaller than an inner diameter of a more proximal conduit section, that is closer to the valve, than the distal tip of the application assembly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

The present description proceeds with respect to a number of different examples. In one example, an application assembly has an exit hose that has an inner diameter that is smaller than the inner diameter of other hose sections in the application assembly. In another example, an accumulator is used with the application assembly to smooth pulsations. In yet another example, the application assembly has both the accumulator and the small diameter exit hose. These and other examples, and combinations of examples, are contemplated herein. Also, the present description proceeds with respect to the examples being deployed on a row unit of a planter. They could just as easily be deployed on a sprayer an air seeder, or other piece of agricultural equipment that is used to apply a liquid nutrient or chemical.

Figure 1:
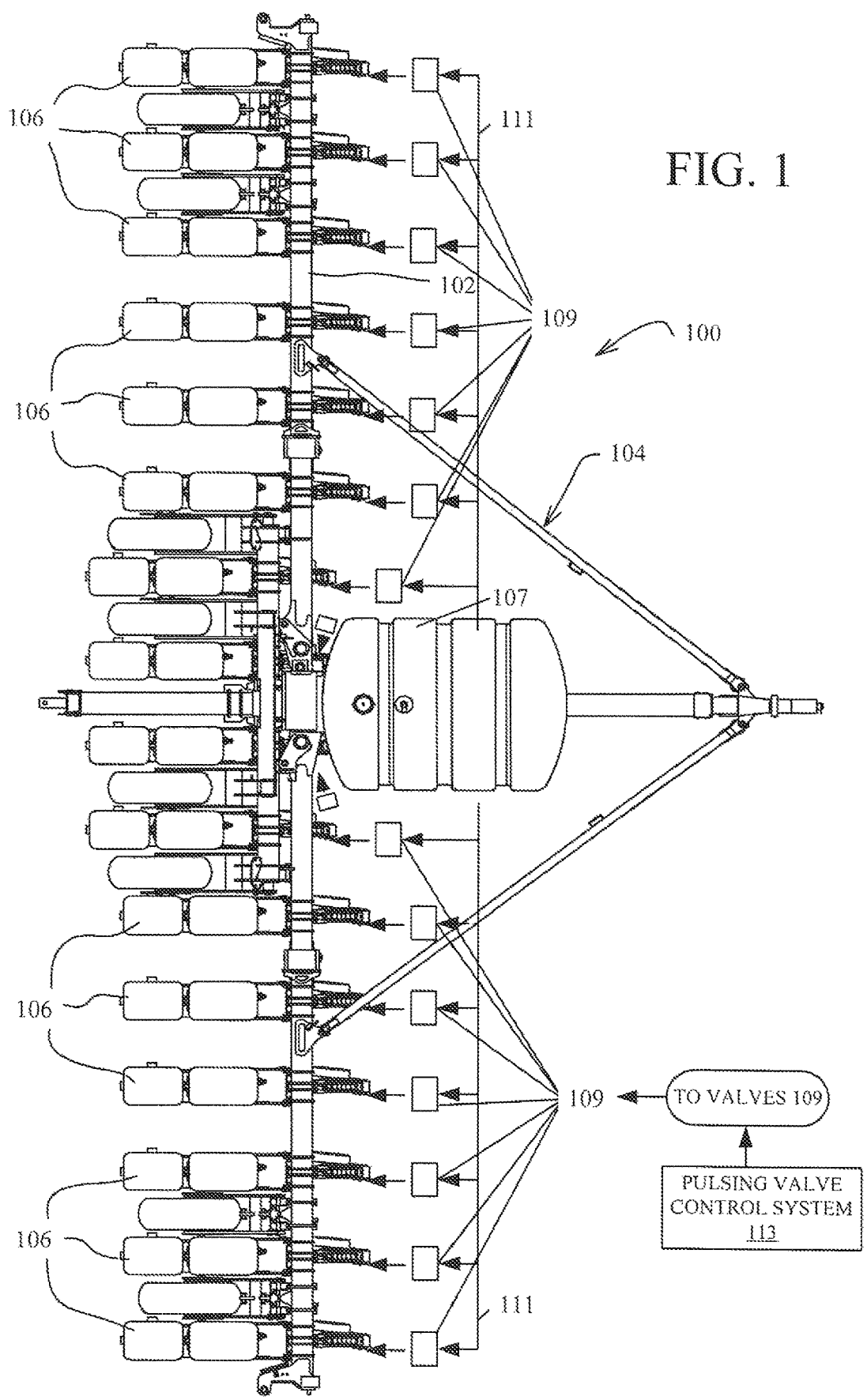
FIG. 1 is a top view of one example of a planting machine.

FIG. 1 is a top view of one example of an agricultural planting machine 100. Machine 100 is a row crop planting machine that illustratively includes a toolbar 102 that is part of a frame 104. FIG. 1 also shows that a plurality of planting row units 106 are mounted to the toolbar 102. Machine 100 can be towed behind another machine, such as a tractor. FIG. 1 shows that liquid material can be stored in a tank 107 and pumped to valves 109 through a supply line 111. In one example, a pulsing valve control system 113 controls valves 109 using, in one example, a pulse width modulated control signal. The flow rate through valve 109 is based on the duty cycle of the control signal (which controls the amount of time the valves are open and closed).

Figure 2:
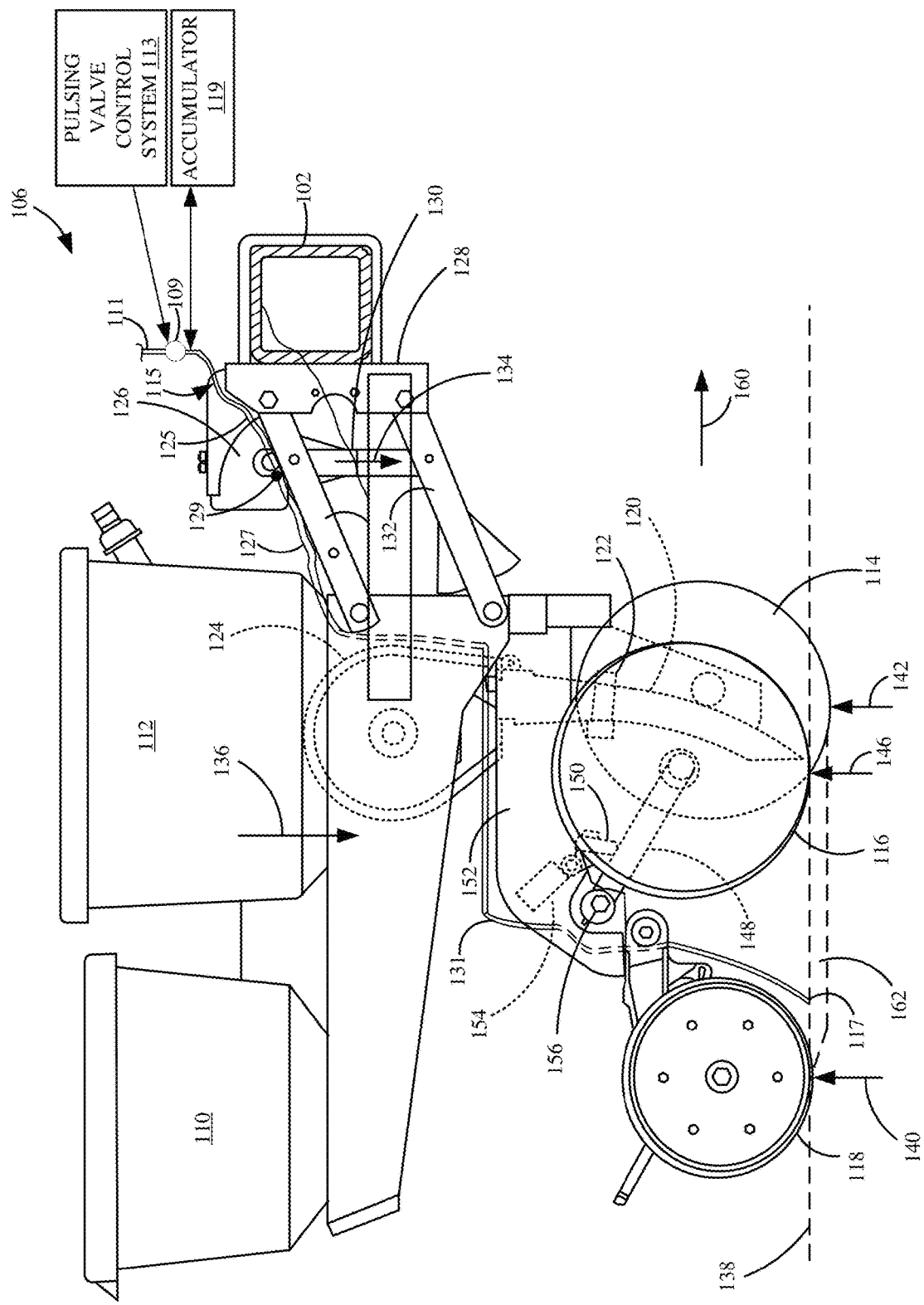
FIG. 2 shows a side view of one example of a row unit of the planting machine illustrated in FIG. 1.

FIG. 2 is a side view showing one example of a row unit 106, with valve 109 and system 113 shown as well. Row unit 106 illustratively includes a chemical tank 110 and a seed storage tank 112. It also illustratively includes a disc opener 114, a set of gauge wheels 116, and a set of closing wheels 118. Seeds from tank 112 are fed by gravity into a seed meter 124. The seed meter controls the rate at which seeds are dropped into a seed tube 120 or other seed delivery system, such as a brush belt, from seed storage tank 112. The seeds can be sensed by a seed sensor 122.

In the example shown in FIG. 2, liquid material is pumped through supply line 111 to an inlet end of valve 109. Valve 109 is controlled by control system 113 to open and close to allow the liquid to pass from the inlet end of valve 109 to an outlet end. System 113 uses a pulse width modulated signal to control the flow rate through valve 109.

As liquid passes through valve 109, it travels through an application assembly 115 from a proximal end (which is attached to an outlet end of valve 109) to a distal tip (or application tip) 117, where the liquid is discharged into a trench, or proximate a trench, opened by disc opener 142 (as is described in more detail below). Because of the pulsed operation of valve 109, this can induce pulsed flow through application assembly 115. Even when the valves 109 are not operated with a pulsed control signal, pulsation can be induced in the flow from other sources as well, such as from the pump. Thus, this can induce discontinuous and pulsed dispensing of liquid through tip 117.

Therefore, in one example, an accumulator 119 is added to application assembly 115, between valve 109 and dispensing tip 117. The accumulator is illustratively inline, downstream of the valve 109 (between valve 109 and tip 117). Thus, when valve 109 opens, the liquid under pressure is introduced into the assembly 115 and the pressure in the assembly 115 increases and is absorbed by accumulator 119. When valve 109 closes, the pressure absorbed by accumulator 119 is released. Accumulator 119 thus absorbs and smooths the pulses in the flow of liquid material being applied.

In another example, application assembly 115 is formed of a plurality of different hose sections, between valve 109 and tip 117. The distal-most hose section can have a smaller inner diameter than the more proximal hose section(s). As is discussed in more detail below, this tends to lengthen the overall pulse exiting the hose to improve coverage.

In yet another example, the accumulator 119 can be used in conjunction with the smaller diameter distal hose section. This further addresses the pulsation in the system.

Figure 3C:
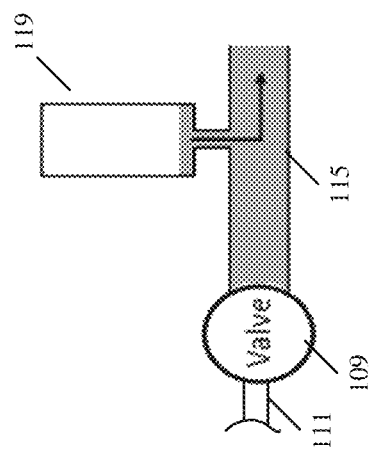
FIGS. 3A-3C are pictorial and schematic illustrations showing one example of how an accumulator can be deployed on the row unit shown in FIG. 2.
Figure 3B:
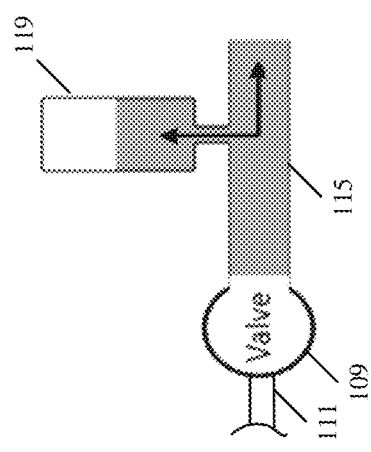
Figure 3A:
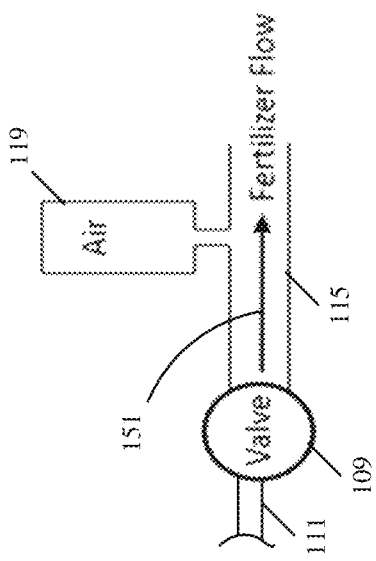

Before describing the operation of row unit 106 in more detail, a brief description of the operation of accumulator 119 will first be provided. FIGS. 3A-3C show accumulator 119, and its operation, during different phases of the control of valve 109. In FIG. 3A, it assumed that valve 109 is closed. A compressible fluid, such as air, is contained within accumulator 119. The direction of fluid flow through application assembly 115 (when valve 109 is open) is indicated by arrow 151. Thus, it can be seen that accumulator 119 is downstream of valve 109 in the direction of fluid flow.

It can be seen in FIG. 3B that valve 109 is now opened. The fluid pumped from supply line 111 through valve 109 may be provided at a wide variety of different pressures, such as pressures in a range of 10-150 psi. When valve 109 opens, this creates a high pressure on the downstream side of valve 109 which compresses the compressible fluid in accumulator 119. The liquid being pumped through valve 109 thus fills a space within accumulator 119, having compressed the compressible fluid (e.g., the air) in accumulator 119. The same type of operation occurs when the pressure pulse is introduced based on the operation of a pump upstream of valve 109, or from another source.

Then, valve 109 is closed again. As the liquid exits tip 117, this creates a lower pressure on the downstream side of valve 109, at the input to accumulator 119. An example of this is shown in FIG. 3C. When that occurs, the compressible fluid in accumulator 119 then again expands, pushing the liquid which was in accumulator 119 out, so that it can pass downstream through the conduit defined by application assembly 115 and be dispensed in the seed trench through distal tip 117.

Accumulator 119 can take a wide variety of different forms. For instance, it can be an air only accumulator in which the compressible fluid in accumulator 119 is air. It can be an air or nitrogen accumulator where the compressible fluid is separated from the liquid being pumped through valve 109 by a membrane, such as a diaphragm or baffles, or a closed cell foam inserted into the flow.

Referring again to FIG. 2, accumulator 119 can also be incorporated into the application assembly 115, itself. In one example, application assembly 115 defines a conduit from the outlet end of valve 109 to the distal tip 117. It can include multiple different hose sections. The present description proceeds with respect to two or three different hose sections but this is only on example. Other numbers of hose sections (or conduit sections) can be used as well.

In one example, application assembly 115 can include first expandable hose section 125, and second expandable hose section 127 that is distal from hose section 125 (e.g., located more toward distal tip 117 than hose section 125) and separated from hose section 125 by an orifice member 129. In the example shown in FIG. 2, application assembly 115 also has a smaller diameter hose section 131 connected to a distal end of hose section 127. Hose section 131 has an inner diameter which is smaller than the inner diameter of hose sections 127 and 125. Hose section 131 (and orifice member 129) can also be made to be less expandable (or non-expandable) under the operating pressure of the liquid passing therethrough (e.g., 10-150 psi) relative to hose sections 125 and 127. In addition, the durometer of hose sections 125 and 127 need not be the same. One can expand more or less under the same pressure than the other. Also, hose section 131 and distal tip 117 can be a single piece or separate pieces. Distal tip 117 can be part of hose section 131 or a separate member. Where distal tip 117 is a separate member, it can be used instead of along with hose section 131. These and other configurations are contemplated herein.

Figures 4A, 4B:
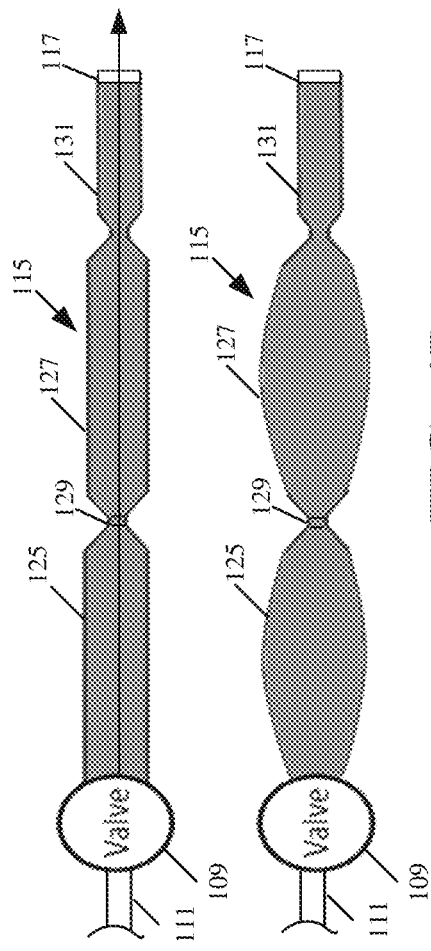
FIGS. 4A and 4B are pictorial and schematic illustrations showing one example in which an expandable hose can be used as an accumulator.

FIGS. 4A and 4B show one example of the operation of application assembly 115 when configured as shown in FIG. 2. Similar items to those shown in FIG. 2 are similarly numbered. In FIG. 4A, it is assumed that valve 109 is closed, so that there is relatively low pressure within dispensing assembly 115. It can be seen that the inner diameter of hose section 131 is smaller than the relaxed inner diameter of hose sections 125 and 127. The direction of fluid flow when valve 109 is open is again illustrated by arrow 151.

In FIG. 4B, it is assumed that valve 109 is opened. Because hose sections 125 and 127 are expandable (e.g., they are shown as being radially expandable-in a direction transverse to their longitudinal axes, or transverse to the direction of fluid flow 151, but they could be longitudinally expandable instead, or in addition) and because hose section 131 is not expandable (or is less expandable) under the same internal pressures, the higher pressure introduced into those hose sections causes the hose sections 125 and 127 to expand, thus acting as an accumulator. Therefore, the more expandable hose sections included in the dispensing assembly (or application assembly) 115, the greater the pulse suppression will be. Hose sections 125 and 127 are shown expanding radially, but they could just as easily expand longitudinally or radially and longitudinally. When the valve 109 is again closed, the hose sections 125 and 127 again compress against the lower pressure of the liquid passing through them, to dispense it through the exit hose section 131 and dispensing tip 117.

It will be noted that, while multiple expandable hose sections 125 and 127 are shown in FIGS. 2 and 4, connected by an orifice member 129, other configurations are contemplated herein. For instance, a single expandable hose section may be provided as the accumulator, or more than two may be provided, with additional restrictions or orifice members 129 disposed between them. The lengths of the expandable hose sections 125 and 127 may vary, depending upon the pressure of the pressurized fluid that is to pass through them during a high pressure phase, based on a desired flow rate, and based upon other desired application characteristics.

Similarly, the inner expandable diameter (when in a relaxed position) of hose sections 125 and 127 as well as the relatively fixed inner diameters of exit hose 131, orifice member 129 and dispensing tip 117 (when it is a separate piece from exit hose 131), may be based upon the pressures of the liquid to be carried through them, the desired flow rate and dispensing characteristics, among other things. In one example, the fluid passing through valve 109 is illustratively at a pressure in a range of 10-150 psi. In that case, the inner diameter of the exit hose section 131 and dispensing tip 117 may be in a range of approximately 2-4 mm and exit hose 131 and tip 117 may be formed so that the inner diameter is fixed under the range of internal pressures, exerted by the liquid (e.g., regardless of whether valve 109 is open or closed). The inner diameter of the accumulator hose sections 125 and 127 may be in a range of 6.35-12.7 mm. The inner diameter of orifice member 129 may be in a range of 0.7-4.5 mm.

The amount by which each accumulator hose length 125 and 127 expands given an input pressure, may vary widely based upon the particular application characteristics desired, based upon the length of the expandable hose sections and the number of expandable hose sections, among other things. In one example, the expandable hose sections have a durometer which permits them to expand by a desired amount under pressurized fluid being introduced through valve 109. Also, in one example, the durometer of exit hose 131 (or distal tip 117, or both) is such that it does not significantly expand under those pressures. This acts to remove or at least smooth out the pulses in the fluid flowing through dispensing assembly 115. It will also be noted that the particular configuration of dispensing assembly 115 may vary among the row units 106 across planter 100. They need not all be the same, although they can be the same as well. Further, the particular configuration of hose lengths 125 and 127 can be the same or different. There can be more or fewer hose sections and more or fewer orifice members. Exit hose 131 can be eliminated when only distal tip 117 is used. These and other configurations are contemplated herein.

Further, it will be noted that the smaller diameter exit hose 131 and/or distal tip 117 can be used alone (without an accumulator) or with an accumulator. By providing an exit hose 131 and/or tip 117 with a smaller inner diameter than hose sections 125 and 127, and being formed of a material that is less expandable under the pressure of the liquid flowing through them than the more proximal hose sections (or being substantially inexpandable under that pressure) a number of additional advantages can be obtained. When combined with the pulse width modulated operation of control valve 109 (or when pulsation is induced by another source), exit hose section 131 and/or tip 117 serve to lengthen the overall pulse exiting the hose, thus providing better in-trench coverage (or other coverage) of liquid material. It can also reduce the gap between pulses in the trench (or wherever else the liquid is being applied).

Further, the capillary action provided by exit hose section 131 and/or distal tip 117 helps to ensure that the application assembly 115, upstream of hose section 131 and/or distal tip 117, remain full, when valve 109 is closed. It can replace the need for an independent check valve in each application assembly 115.

Also, as liquid exits hose section 131 and/or tip 117, a jetting effect is created because the fluid is exiting at higher linear speed through hose section 131 and/or tip 117 than it is traveling upstream in application assembly 115. This is because of the lower inner diameter of exit hose section 131 and/or tip 117 relative to that of the hose sections upstream. This reduces the likelihood that the end of hose 131 and/or tip 117 will be plugged.

Some parts of row unit 106 will now be discussed in more detail. First, it will be noted that there are different types of seed meters, and the one that is shown is shown for the sake of example only. For instance, in one example, each row unit 106 need not have its own seed meter. Instead, metering or other singulation or seed dividing techniques can be performed at a central location, for groups of row units 106. The metering systems can include rotatable discs, rotatable concave or bowl-shaped devices, among others. The seed delivery system can be a gravity drop system (such as that shown in FIG. 2) in which seeds are dropped through the seed tube 120 and fall (via gravitational force) through the seed tube into the seed trench. Other types of seed delivery systems are assistive systems, in that they do not simply rely on gravity to move the seed from the metering system into the ground. Instead, such systems actively capture the seeds from the seed meter and physically move the seeds from the meter to a lower opening, where they exit into the ground or trench.

A downforce actuator 126 is mounted on a coupling assembly 128 that couples row unit 106 to toolbar 102. Actuator 126 can be a hydraulic actuator, a pneumatic actuator, a spring-based mechanical actuator or a wide variety of other actuators. In the example shown in FIG. 2, a rod 130 is coupled to a parallel linkage 132 and is used to exert an additional downforce (in the direction indicated by arrow 134) on row unit 106. The total downforce (which includes the force indicated by arrow 134 exerted by actuator 126, plus the force due to gravity acting on row unit 106, and indicated by arrow 136) is offset by upwardly directed forces acting on closing wheels 118 (from ground 138 and indicated by arrow 140) and double disc opener 114 (again from ground 138 and indicated by arrow 142). The remaining force (the sum of the force vectors indicated by arrows 134 and 136, minus the force indicated by arrows 140 and 142) and the force on any other ground engaging component on the row unit (not shown), is the differential force indicated by arrow 146. The differential force may also be referred to herein as the downforce margin. The force indicated by arrow 146 acts on the gauge wheels 116. This load can be sensed by a gauge wheel load sensor which may be located anywhere on row unit 106 where it can sense that load. It can also be placed where it may not sense the load directly, but a characteristic indicative of that load. Both sensing the load directly or indirectly are contemplated herein and will be referred to as sensing a force characteristic indicative of that load (or force). For example, it can be disposed near a set of gauge wheel control arms (or gauge wheel arm) 148 that movably mount gauge wheels 116 to shank 152 and control an offset between gauge wheels 116 and the discs in double disc opener 114, to control planting depth. Arms (or gauge wheel arms) 148 illustratively abut against a mechanical stop (or arm contact member-or wedge) 150. The position of mechanical stop 150 relative to shank 152 can be set by a planting depth actuator assembly 154. Control arms 148 illustratively pivot around pivot point 156 so that, as planting depth actuator assembly 154 actuates to change the position of mechanical stop 150, the relative position of gauge wheels 116, relative to the double disc opener 114, changes, to change the depth at which seeds are planted. This is described in greater detail below.

In operation, row unit 106 travels generally in the direction indicated by arrow 160. The double disc opener 114 opens a furrow in the soil 138, and the depth of the furrow 162 is set by planting depth actuator assembly 154, which, itself, controls the offset between the lowest parts of gauge wheels 116 and disc opener 114. Seeds are dropped through seed tube 120, into the furrow 162 and closing wheels 118 close the soil.

Example 1 is a mobile agricultural machine, comprising:
ground engaging elements that carry the machine over a field;
a valve, having an inlet end configured to be connected to a source of liquid, under pressure, to be applied to the field and an outlet end;
a pump pumping the liquid from the source to the valve; and
an application assembly having a proximal end connected to the outlet end of the valve and having a distal end through which pulses of the liquid pass to be applied to the field, the application assembly defining a conduit between the proximal end and the distal end, and having a first hose section with a first inner diameter defining a first section of the conduit and a second hose section, with a second inner diameter, smaller than the first inner diameter, defining a second section of the conduit, the second section of the conduit lengthening the pulses of the liquid.

Example 2 is the mobile agricultural machine of any or all previous examples wherein the valve is controlled with a pulsed control signal.

Example 3 is the mobile agricultural machine of any or all previous examples wherein the second hose section defines the second section of the conduit distal of the first section of the conduit.

Example 4 is the mobile agricultural machine of any or all previous examples wherein the second hose section extends to the distal end
of the conduit.

Example 4 is the mobile agricultural machine of claim 4 wherein the second hose section is configured so the inner diameter is sufficiently small to exhibit a capillary effect that retains the liquid in the second hose section when the valve is closed.

Example 6 is the mobile agricultural machine of any or all previous examples wherein the first hose section has an inner diameter in a range of 6.35-12.77 mm.

Example 7 is the mobile agricultural machine of any or all previous examples wherein the second hose section has an inner diameter in a range of 2-4 mm.

Example 8 is the mobile agricultural machine of any or all previous examples wherein the second hose section is configured to retain its inner diameter when the liquid under pressure is in the second section of the conduit.

Example 9 is the mobile agricultural machine of any or all previous examples wherein the liquid is introduced through the valve into the conduit at a pressure in a range of 10-150 psi.

Example 10 is the mobile agricultural machine of any or all previous examples wherein the second hose section further comprises:
an orifice member disposed on a distal tip of the first hose section and defining an orifice that has a constant inner diameter regardless of whether the valve is opened or closed.

Example 11 is the mobile agricultural machine of any or all previous examples wherein the orifice member defines the orifice with the inner diameter in a range of 0.7-4.5 mm.

Example 12 is the mobile agricultural machine of any or all previous examples wherein the first hose section is configured to be expandable when the liquid under pressure is in the first section of the conduit.

Example 13 is the mobile agricultural machine of any or all previous examples wherein the application assembly further comprises:

a third hose section, with the first inner diameter, between the first hose section and the second hose section, the third hose section defining a third section of the conduit between the first section of the conduit and the second section of the conduit and separated from the first hose section by an orifice member defining an orifice with a fixed inner diameter under pressure exerted by the liquid under pressure.

Example 14 is a mobile agricultural machine, comprising:
a ground engaging element that carries the machine over a field;
a valve, having an inlet end configured to be connected to a source of liquid, under pressure, to be applied to the field and an outlet end, the valve being controlled with a pulsed control signal; and
an application assembly having a proximal end connected to the outlet end of the valve and having a distal end through which the liquid passes to be applied to the field, the application assembly defining a conduit between the proximal end and the distal end, and having a first hose section with a first inner diameter defining a first section of the conduit and a second hose section, distal of the first hose section, with a second inner diameter, smaller than the first inner diameter, defining a second section of the conduit, distal of the first section of the conduit, wherein the second hose section is configured to retain its inner diameter when the liquid under pressure is in the second section of the conduit.

Example 15 is the mobile agricultural machine of any or all previous examples wherein the second hose section extends to the distal end of the conduit.

Example 16 is the mobile agricultural machine of any or all previous examples wherein the first hose section has an inner diameter in a range of 6.35-12.77 mm.

Example 17 is the mobile agricultural machine of any or all previous examples wherein the second hose section has an inner diameter in a range of 2-4 mm.

Example 18 is the mobile agricultural machine of any or all previous examples wherein the liquid is introduced through the valve into the conduit at a pressure in a range of 10-150 psi.

Example 19 is the mobile agricultural machine of any or all previous examples and further comprising:
an orifice member disposed on a distal tip of the second hose section and defining an orifice that has a constant inner diameter regardless of whether the valve is opened or closed.

Example 20 is a mobile agricultural machine, comprising:
a ground engaging element that carries the machine over a field;
a valve, having an inlet end configured to be connected to a source of liquid, under pressure, to be applied to the field and an outlet end, the valve being controlled, to be opened and closed, with a pulse width modulated control signal; and
an application assembly having a proximal end connected to the outlet end of the valve and having a distal end through which the liquid passes to be applied to the field, the application assembly defining a conduit between the proximal end and the distal end, and having a first hose section with a first inner diameter defining a first section of the conduit and a second hose section, with a second inner diameter, smaller than the first inner diameter, defining a second section of the conduit distal of the first section of the conduit and having an orifice member disposed on a distal tip of the second hose section, the orifice member defining an orifice with an inner diameter that remains fixed regardless of whether the valve is opened or closed.

Although the subject matter has been described in language specific to structural features and/or methodological

What is claimed is:

1. A mobile agricultural machine, comprising:
ground engaging elements that carry the machine over a field;
a valve, having an inlet end configured to be connected to a source of liquid, under pressure, to be applied to the field and an outlet end;
a pump pumping the liquid from the source to the valve; and
an application assembly having a proximal end connected to the outlet end of the valve and having a distal end through which pulses of the liquid pass to be applied to the field, the application assembly defining a conduit between the proximal end and the distal end, and having a first hose section with a first inner diameter defining a first section of the conduit and a second hose section, with a second inner diameter, smaller than the first inner diameter, defining a second section of the conduit, the second section of the conduit lengthening the pulses of the liquid.

2. The mobile agricultural machine of claim 1 wherein the valve is controlled with a pulsed control signal.

3. The mobile agricultural machine of claim 1 wherein the second hose section defines the second section of the conduit distal of the first section of the conduit.

4. The mobile agricultural machine of claim 3 wherein the second hose section extends to the distal end of the conduit.

5. The mobile agricultural machine of claim 4 wherein the second hose section is configured so the inner diameter is sufficiently small to exhibit a capillary effect that retains the liquid in the second hose section when the valve is closed.

6. The mobile agricultural machine of claim 4 wherein the first hose section has an inner diameter in a range of 6.35-12.77 mm.

7. The mobile agricultural machine of claim 4 wherein the second hose section has an inner diameter in a range of 2-4 mm.

8. The mobile agricultural machine of claim 3 wherein the second hose section is configured to retain its inner diameter when the liquid under pressure is in the second section of the conduit.

9. The mobile agricultural machine of claim 8 wherein the liquid is introduced through the valve into the conduit at a pressure in a range of 10-150 psi.

10. The mobile agricultural machine of claim 3 wherein the second hose section further comprises:
an orifice member disposed on a distal tip of the first hose section and defining an orifice that has a constant inner diameter regardless of whether the valve is opened or closed.

11. The mobile agricultural machine of claim 10 wherein the orifice member defines the orifice with the inner diameter in a range of 0.7-4.5 mm.

12. The mobile agricultural machine of claim 3 wherein the first hose section is configured to be expandable when the liquid under pressure is in the first section of the conduit.

13. The mobile agricultural machine of claim 12 wherein the application assembly further comprises:
a third hose section, with the first inner diameter, between the first hose section and the second hose section, the third hose section defining a third section of the conduit between the first section of the conduit and the second section of the conduit and separated from the first hose section by an orifice member defining an orifice with a fixed inner diameter under pressure exerted by the liquid under pressure.

14. A mobile agricultural machine, comprising:
a ground engaging element that carries the machine over a field;
a valve, having an inlet end configured to be connected to a source of liquid, under pressure, to be applied to the field and an outlet end, the valve being controlled with a pulsed control signal; and
an application assembly having a proximal end connected to the outlet end of the valve and having a distal end through which the liquid passes to be applied to the field, the application assembly defining a conduit between the proximal end and the distal end, and having a first hose section with a first inner diameter defining a first section of the conduit and a second hose section, distal of the first hose section, with a second inner diameter, smaller than the first inner diameter, defining a second section of the conduit, distal of the first section of the conduit, wherein the second hose section is configured to retain its inner diameter when the liquid under pressure is in the second section of the conduit.

15. The mobile agricultural machine of claim 14 wherein the second hose section extends to the distal end of the conduit.

16. The mobile agricultural machine of claim 15 wherein the first hose section has an inner diameter in a range of 6.35-12.77 mm.

17. The mobile agricultural machine of claim 16 wherein the second hose section has an inner diameter in a range of 2-4 mm.

18. The mobile agricultural machine of claim 17 wherein the liquid is introduced through the valve into the conduit at a pressure in a range of 10-150 psi.

19. The mobile agricultural machine of claim 18 and further comprising:
an orifice member disposed on a distal tip of the second hose section and defining an orifice that has a constant inner diameter regardless of whether the valve is opened or closed.

20. A mobile agricultural machine, comprising:
a ground engaging element that carries the machine over a field;
a valve, having an inlet end configured to be connected to a source of liquid, under pressure, to be applied to the field and an outlet end, the valve being controlled, to be opened and closed, with a pulse width modulated control signal; and
an application assembly having a proximal end connected to the outlet end of the valve and having a distal end through which the liquid passes to be applied to the field, the application assembly defining a conduit between the proximal end and the distal end, and having a first hose section with a first inner diameter defining a first section of the conduit and a second hose section, with a second inner diameter, smaller than the first inner diameter, defining a second section of the conduit distal of the first section of the conduit and having an orifice member disposed on a distal tip of the second hose section, the orifice member defining an orifice with an inner diameter that remains fixed regardless of whether the valve is opened or closed.

* * * * *